(12) United States Patent
Getreuer et al.

(10) Patent No.: US 9,941,977 B2
(45) Date of Patent: Apr. 10, 2018

(54) DATA TRANSMISSION BETWEEN DEVICES OVER AUDIBLE SOUND

(71) Applicant: Google Inc., Mountain View, CA (US)

(72) Inventors: Pascal Tom Getreuer, San Francisco, CA (US); Murphy Martin Stein, Redwood City, CA (US); Ryan Michael Rifkin, San Francisco, CA (US); Richard Francis Lyon, Los Altos, CA (US); Ian Rickard Muldoon, Ben Lomond, CA (US)

(73) Assignee: Google LLC, Mountain View, CA (US)

( * ) Notice: Subject to any disclaimer, the term of this patent is extended or adjusted under 35 U.S.C. 154(b) by 75 days.

(21) Appl. No.: 14/588,882

(22) Filed: Jan. 2, 2015

(65) Prior Publication Data

US 2016/0197682 A1 Jul. 7, 2016

(51) Int. Cl.
*H04B 11/00* (2006.01)
(52) U.S. Cl.
CPC ................... *H04B 11/00* (2013.01)
(58) Field of Classification Search
CPC ....................................................... H04B 11/00
USPC ......................................................... 367/134
See application file for complete search history.

(56) References Cited

U.S. PATENT DOCUMENTS

| | | | |
|---|---|---|---|
| 6,433,673 B1* | 8/2002 | Yin ..................... | G08B 3/1025 340/384.4 |
| 7,269,557 B1* | 9/2007 | Bailey ..................... | G10L 13/07 704/251 |
| 7,349,481 B2 | 3/2008 | Steentra | |
| 2003/0212549 A1 | 11/2003 | Steentra | |
| 2003/0220801 A1* | 11/2003 | Spurrier .................. | G10L 19/00 704/503 |
| 2009/0307541 A1* | 12/2009 | Razazian .......... | H03M 13/2707 714/701 |
| 2014/0045645 A1 | 2/2014 | ElHoiydi | |

FOREIGN PATENT DOCUMENTS

EP 1755242 1/2008

OTHER PUBLICATIONS

Beard; A discrete Fourier transform based digital DTMF detection algorithm; Oct. 2, 1995.*
Allen, et al., "Signal Analysis: Time, Frequency, Scale, and Structure", IEEE Press, 2004, 407 pages.
Beard, et al., "A Discrete Fourier Transform Based Digital DTMF Detection Algorithm", MS State DSP Conference, 1995, pp. 59-71.

(Continued)

*Primary Examiner* — Isam A Alsomiri
*Assistant Examiner* — Amie M Ndure
(74) *Attorney, Agent, or Firm* — IP Spring (57) ABSTRACT

Implementations generally relate to providing data transmission between devices over audible sound. In some implementations, a method includes mapping each symbol of data to a frequency combination, where each frequency combination includes one or more frequencies. The method further includes generating a sine wave for each frequency. The method further includes adding sine waves for a given symbol to obtain a resulting sine wave. The method further includes applying a window function to the resulting sine wave to obtain a data signal.

20 Claims, 9 Drawing Sheets

(56) References Cited

OTHER PUBLICATIONS

European Patent Office, International Search Report for International Patent Application No. PCT/US2015/067862, dated May 18, 2016, 5 pages.
European Patent Office, Written Opinion for International Patent Application No. PCT/US2015/067862, dated May 18, 2016, 8 pages.
C.V Lopes et al.; Aerial Acoustic Communications; "Applications of Signal Processing to Audio and Acoustics"; 2001 IEEE Workshop; pp. 219-222.
Anil Madhavapeddy et al.; "Context-Aware Computing with Sound"; UbiComp 2003; Ubiquitous Computing; Springer 2003; pp. 315-332.
Anil Madhavapeddy et al.; "Audio Networking: The Forgotten Wireless Technology"; Pervasive Computing, IEEE, 4 (3):55-60; 2005.
Tho Nguyen et al.; "Feasibility Study of DTMF Communications for Robots"; 2004.
Suvad Selman et al.; Comparative Analysis of Methods Used in the Design of DTMF Tone Detectors; Telecommunications and Malaysia International Conference on Communications, 2007; ICT-MICC 2007 IEEE International Conference; pp. 335-339; IEEE 2007.

* cited by examiner

DATA TRANSMISSION BETWEEN DEVICES OVER AUDIBLE SOUND

BACKGROUND

Some mobile applications enable users to participate in social activities where devices of users can communicate with other devices that are physically close by. For example, users may want to locate other users in the same physical location. In another example, users may have taken some photos of each other and may want to share their photos with each other.

SUMMARY

Implementations generally relate to providing data transmission between devices over audible sound. In some implementations, a method includes mapping each symbol of data to a frequency combination, where each frequency combination includes one or more frequencies. The method further includes generating a sine wave for each frequency. The method further includes adding sine waves for a given symbol to obtain a resulting sine wave. The method further includes applying a window function to the resulting sine wave to obtain a data signal.

With further regard to the method, in some implementations, the data signal is audible. In some implementations, each symbol is associated with a unique combination of frequencies. In some implementations, the mapping of each symbol of data to a frequency combination is based on predetermined selection constraints. In some implementations, the mapping of each symbol of data to a frequency combination is based on predetermined selection constraints, where one or more predetermined selection constraints involve musical constraints. In some implementations, the mapping of each symbol of data to a frequency combination is based on predetermined selection constraints, where one or more predetermined selection constraints include selecting frequencies that provide a musical sound to data transmission. In some implementations, the method further includes concatenating symbol waveforms without any gaps. In some implementations, the method further includes concatenating symbol waveforms with gaps.

In some implementations, a system includes one or more processors, and logic encoded in one or more tangible media for execution by the one or more processors. When executed, the logic is operable to perform operations including: mapping each symbol of data to a frequency combination, where each frequency combination includes one or more frequencies; generating a sine wave for each frequency; adding sine waves for a given symbol to obtain a resulting sine wave; and applying a window function to the resulting sine wave to obtain a data signal.

With further regard to the system, in some implementations, the data signal is audible. In some implementations, each symbol is associated with a unique combination of frequencies. In some implementations, the mapping of each symbol of data to a frequency combination is based on predetermined selection constraints. In some implementations, the mapping of each symbol of data to a frequency combination is based on predetermined selection constraints, where one or more predetermined selection constraints involve musical constraints. In some implementations, the mapping of each symbol of data to a frequency combination is based on predetermined selection constraints, where one or more predetermined selection constraints include selecting frequencies that provide a musical sound to data transmission. In some implementations, the logic when executed is further operable to perform operations including concatenating symbol waveforms without any gaps. In some implementations, the logic when executed is further operable to perform operations including concatenating symbol waveforms with gaps.

In some implementations, a method includes detecting tones in a data signal. The method further includes determining frequencies from the tones. The method further includes mapping each frequency combination to a symbol of data, where each frequency combination includes one or more of the frequencies.

With further regard to the method, in some implementations, the data signal is audible. In some implementations, the method further includes estimating a symbol phase In some implementations, the method further includes determining data from each symbol.

DETAILED DESCRIPTION

Implementations described herein provide data transmission between devices over audible sound. Implementations provide data transmission between mobile devices using audible sound. In various implementations, a system uses dual-tone multi-frequency (DTMF) modulation. Implementations using DTMF provide a pleasant sounding protocol for data transmission over audible sound.

In various implementations, an encoder maps each symbol of data to a frequency combination, where each frequency combination includes one or more frequencies. The encoder then generates a sine wave for each frequency. The encoder then adds sine waves for a given symbol to obtain a resulting sine wave. The encoder then applies a window function to the resulting sine wave to obtain a data signal, and then transmits the data signal. In various implementations, the data signal is audible.

In various implementations, each symbol is associated with a unique combination of frequencies. In various implementations, the mapping of each symbol of data to a frequency combination is based on predetermined selection constraints. For example, in some implementations, one or more predetermined selection constraints involve musical constraints. In some implementations, one or more predetermined selection constraints include selecting frequencies that provide a musical sound to data transmission.

In some implementations, a decoder receives data signal. The decoder then detects tones in a data signal. The decoder then determines frequencies from the tones. The decoder then maps each frequency combination to a symbol of data, where each frequency combination includes one or more of the frequencies. The decoder then determines data from each symbol.

Implementations described herein adapt the use of DTMF for robustness to survive transmission through the air, which is a more difficult environment than the telephone voice channel. Implementations provide robust noise and motion detection of the tones. Implementations described herein take advantage of smart phones having the ability to play and record sound, a potential portable medium for data communication.

Implementations address challenges associated with data transmission of sound. Such challenges may involve the sound signal being degraded by multiple propagation paths (with echoes), background noise, and Doppler effect. Implementations limit computation and battery consumption. Implementations transmit data over sound such that the data survives audio compression, e.g., to transmit using sound over teleconferences, which necessitates using audio in the audible range. Implementations also provide data transmission over sound in a way that the sound of the transmission is not unpleasant or painful for people to hear.

Figure 1:
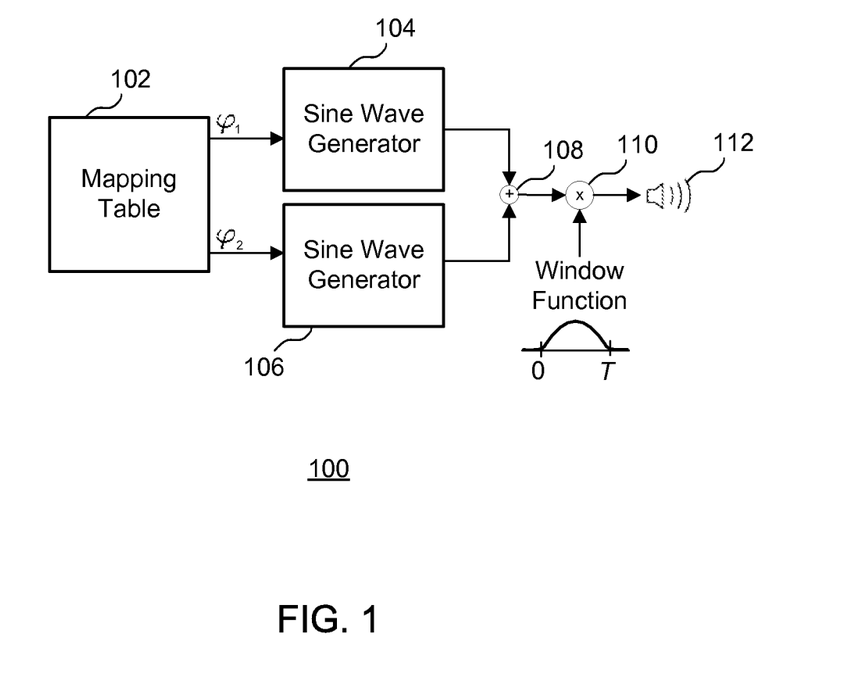
FIG. 1 illustrates a block diagram of an example encoder for encoding data, which may be used to implement the implementations described herein.

FIG. 1 illustrates a block diagram of an example encoder 100 for encoding data, which may be used to implement the implementations described herein. As shown, encoder 100 includes a mapping table 102, sine wave generators 104 and 106, an adder 108, a window function 110, and a speaker 112. Implementations directed to encoder 100 are described in more detail below in connection with FIG. 2.

For ease of illustration, FIG. 1 shows one block for each of mapping table 102, sine wave generators 104 and 106, an adder 108, a window function 110, and a speaker 112. Each of blocks 102, 104, 106, 108, 110, and 112 may represent multiple mapping tables, sine wave generators, adders, window functions, and speakers.

Figure 2:
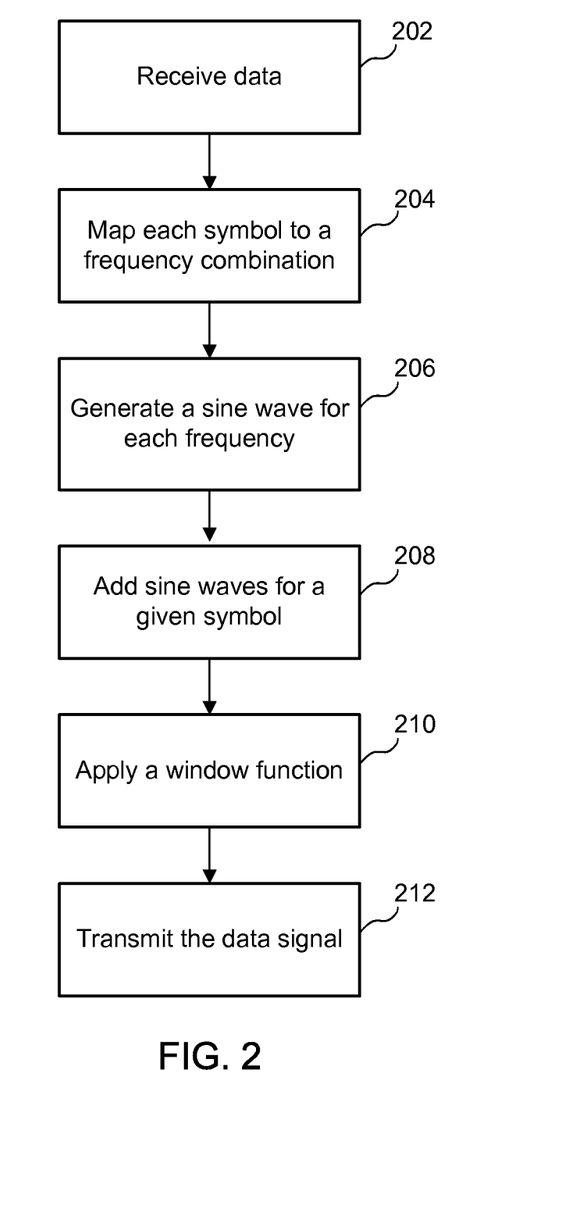
FIG. 2 illustrates an example simplified flow diagram for encoding data, according to some implementations.

FIG. 2 illustrates an example simplified flow diagram for encoding data, according to some implementations. Referring to both FIGS. 1 and 2, a method is initiated in block 202, where encoder 100 receives data. Encoder 100 then determines symbols from received data.

In block 204, encoder 100 maps each symbol of data to a frequency combination. In various implementations, each frequency combination includes one or more frequencies. In various implementations, encoder 100 associates each symbol with a unique combination of frequencies. For example, encoder 100 may represent different symbols as a combinations of K frequencies selected from a table of N frequencies. For ease of illustration, FIG. 1 shows K frequencies, where K=2. In various implementations, K may be any number greater than 2, depending on the particular implementations.

Various implementations described herein refer to a generalization of K>2 as DTMF for familiarity. In various implementations, a more precise name may be a multi-tone multi-frequency. In various implementations, symbols are a combination of K tones selected from a set of N frequencies, for a possible alphabet size of $$\binom{N}{K}.$$

In various implementations, encoder 100 uses no gaps between symbols.

In various implementations, encoder 100 selects combinations of frequencies that are more easily distinguishable to the decoder. As such, if a particular frequency is detected at a decoder, the decoder will be able to determine the corresponding symbol.

In various implementations, the mapping of each symbol of data to a frequency combination is based on predetermined selection constraints. In other words, encoder 100 applies one or more predetermined selection constraints when selecting frequency combinations for each symbol. Encoder 100 implements various constraints when selecting frequency combinations rather than selecting frequencies from disjointed groups. For example, in some implementations, one constraint may be that encoder 100 selects K frequencies from one group of frequencies without replacement. In some implementations, another constraint may be that encoder 100 selects frequencies are at least 2 indices apart from one another. In some implementations, as a means to circumvent intersymbol interference, another constraint may that encoder 100 requires that the current symbol has no selected frequencies in common with the preceding symbol.

In various implementations, one or more predetermined selection constraints involve musical constraints. For example, in various implementations, a predetermined selection constraint may include encoder 100 selecting the frequencies that provide a musical sound to data transmission. In some implementations, encoder 100 selects frequencies that correspond to musical tones of a predetermined musical scale. For example, in some implementations, encoder 100 may select frequencies of tones of octaves of the pentatonic scale in F# major. Relative to a given base frequency, one octave of the F# pentatonic scale with just temperament has the ratios 1, 9/8, 5/4, 3/2, 5/3. In some implementations, encoder 100 may add overtones to the tone frequencies. Such over overtones may cause the transmitted sound to resemble a particular instrument (e.g., a tuba) in order to enable personalization of the sound.

Referring still to FIG. 2, in block 206, encoder 100 generates a sine wave for each frequency. Unlike touch-tone receivers, a signal broadcasted over the air may be affected by Doppler shift due to motion, and is more susceptible to background noise. In various implementations, encoder 100 may include noise and Doppler-tolerant tone detectors.

Figure 3A:
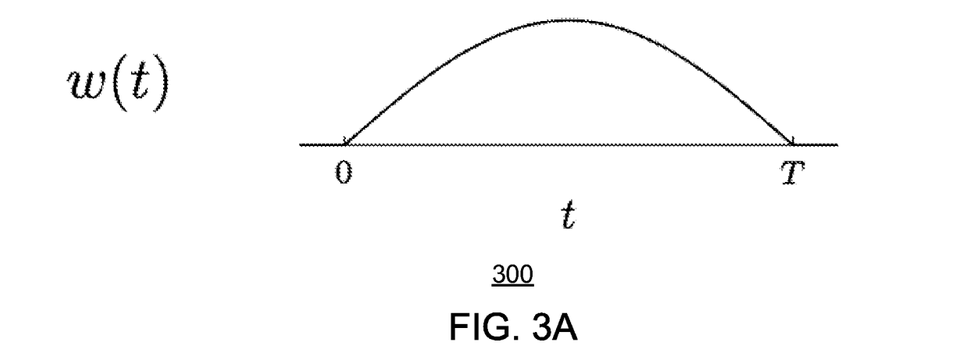
FIG. 3A illustrations an example sine window, according to some implementations.

FIG. 3A illustrations an example sine window 300, according to some implementations. In various implementations, encoder 100 synthesizes tones as windowed sinusoids, $$x\text{tone}(t)=w(t)\sin(2\pi\varphi t), \quad (1)$$

where $\varphi$ is the tone frequency. The function w(t) is a sine window (also known as the cosine window), $$w(t) = \begin{cases} \sin(\pi t/T) & 0<t<T, \\ 0 & \text{otherwise,} \end{cases} \quad (2)$$

where T is the size of the window (e.g., 50 ms for 20 tones/s). Windowing spreads the tone energy in the frequency domain since multiplication in the time domain is convolution in the frequency domain.

Figure 3B:
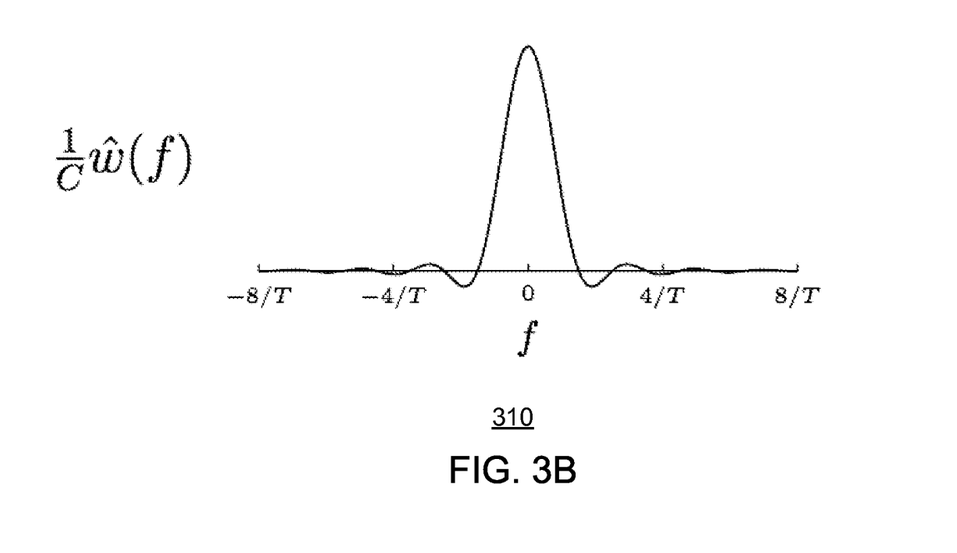
FIG. 3B illustrations an example Fourier transform, according to some implementations.

FIG. 3B illustrations an example Fourier transform 310 of sine window 300 of FIG. 3A, according to some implementations. In some implementations, the Fourier transform of the sine window w(t) is $$\hat{w}(f) = \int_0^T \sin(\pi t/T) e^{i2\pi ft} dt \qquad (3)$$
$$= C \frac{\cos(\pi fT)}{1 - (2fT)^2}, \quad C = \frac{2T}{\pi} \exp(i\pi fT),$$

which has a removable singularity at |f|=1/(2T) (the expression becomes 0/0 at this point, but the limit exists and is $C\pi/4$). The main lobe is in |f|<3/(2T).

As indicated above, In various implementations, encoder 100 uses a combination of K tones of different frequencies to encode a symbol. Given N possible frequencies, there is an alphabet of $$\binom{N}{K}$$

distinct symbols. For each symbol in the alphabet, S may be a mapping that K assigns a distinct combination of K tone frequencies. A symbol s is encoded by looking up its tone frequency combination, then synthesizing and summing those tones, $$x_s(t) = \sum_{\varphi \in S(s)} w(t) \sin(2\pi \varphi t). \qquad (4)$$

In block 208, encoder 100 adds sine waves for a given symbol.

In block 210, encoder 100 applies a window function to the resulting sine wave to obtain a data signal, where the data signal contains tones. In various implementations, encoder 100 encodes a sequence of symbols by concatenating the symbol waveforms without any gaps. In some implementations, encoder 100 may encode a sequence of symbols by concatenating the symbol waveforms with gaps. To transmit a small fixed-length amount of data, encoder 100 may reserve one symbol value in the alphabet as a special spacer value to mark the beginning of a token. This enables a receiver to begin listening mid-broadcast and to use the spacer to disambiguate the phase of the symbols within the sequence.

In various implementations, encoder 100 multiplies the resulting sine wave with the window function such that the sine wave has a predetermined shape (e.g., as shown in FIG. 1). As described in more detail herein, in various implementations, the data signal is audible, and contains audible tones.

In block 212, encoder 100 then transmits the data signal.

Figure 4:
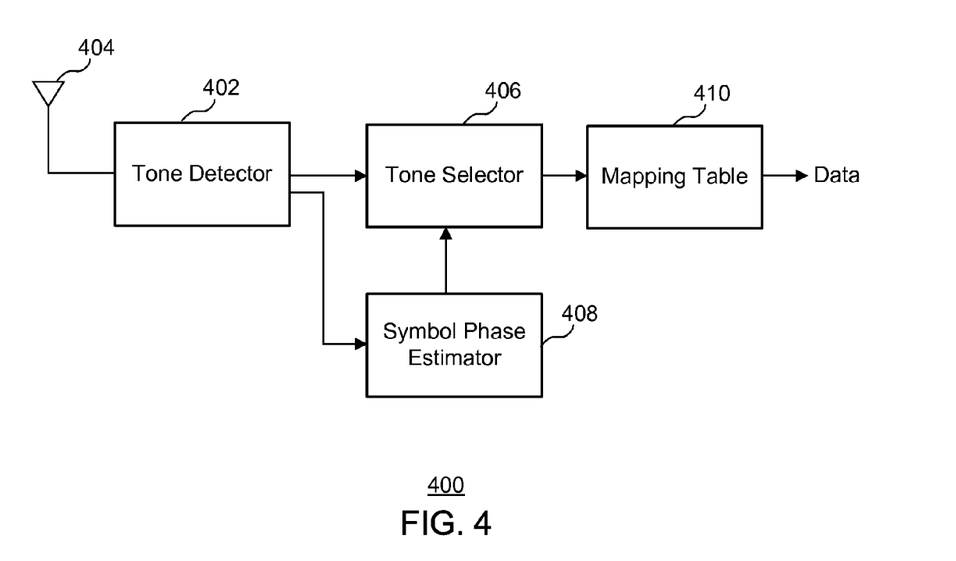
FIG. 4 illustrates a block diagram of an example decoder for decoding data, according to some implementations.

FIG. 4 illustrates a block diagram of an example decoder 400 for decoding data, according to some implementations. As shown, decoder 400 includes a tone detector 402, a microphone 404, a tone selector 406, and a symbol phase estimator 408. In various implementations, tone detector 402 may be a filter bank of tone detectors.

For ease of illustration, FIG. 4 shows one block for each of tone detector 402, microphone 404, tone selector 406, and symbol phase estimator 408. Each of blocks 402, 404, 406, and 408 may represent multiple tone detectors, microphones, tone selectors, and symbol phase estimators. For example, as indicated above, box 402 may represent multiple tone detectors.

Figure 5:
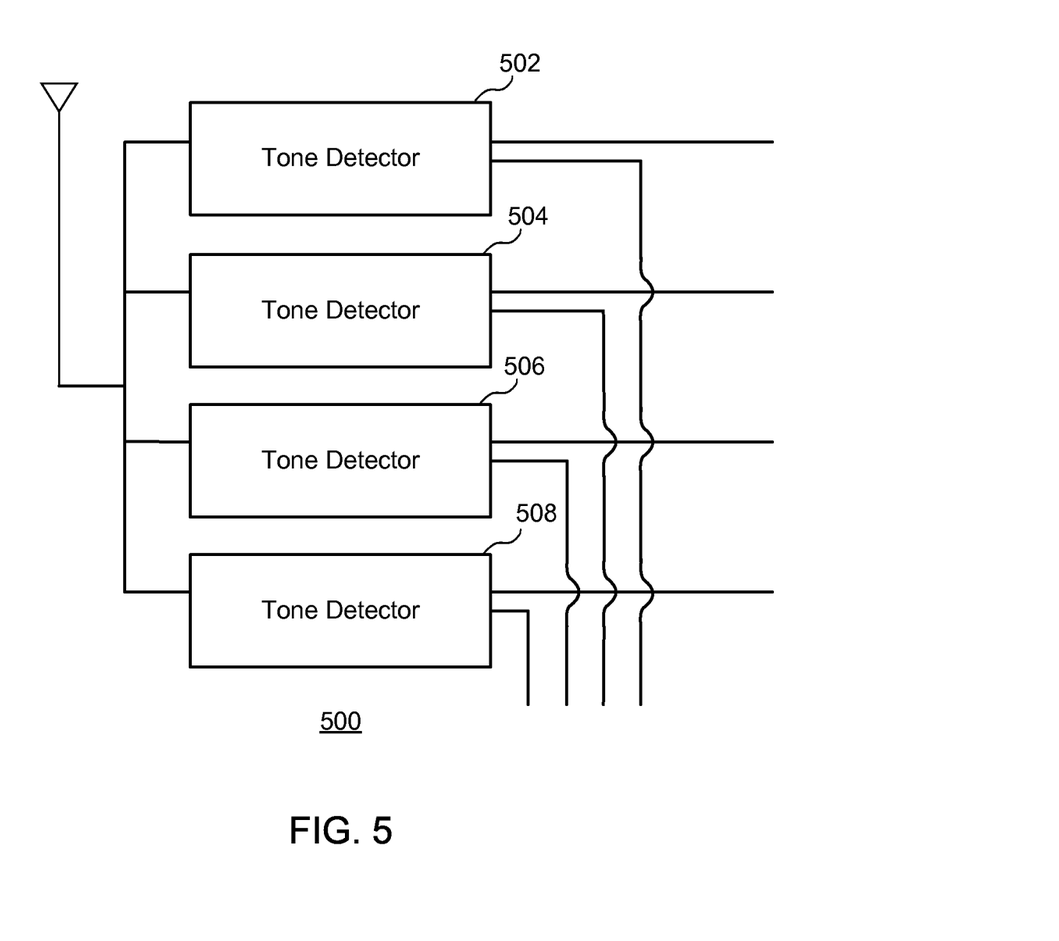
FIG. 5 illustrates a block diagram of example tone detectors, according to some implementations.

FIG. 5 illustrates a block diagram of example tone detectors 502, 504, 506, and 508, which may be used to implement tone detector 402 of FIG. 4, according to some implementations. In various implementations, each tone detector 502, 504, 506, and 508 is tuned to one of the N frequencies and outputs a signal indicating the power of that frequency.

Figure 6:
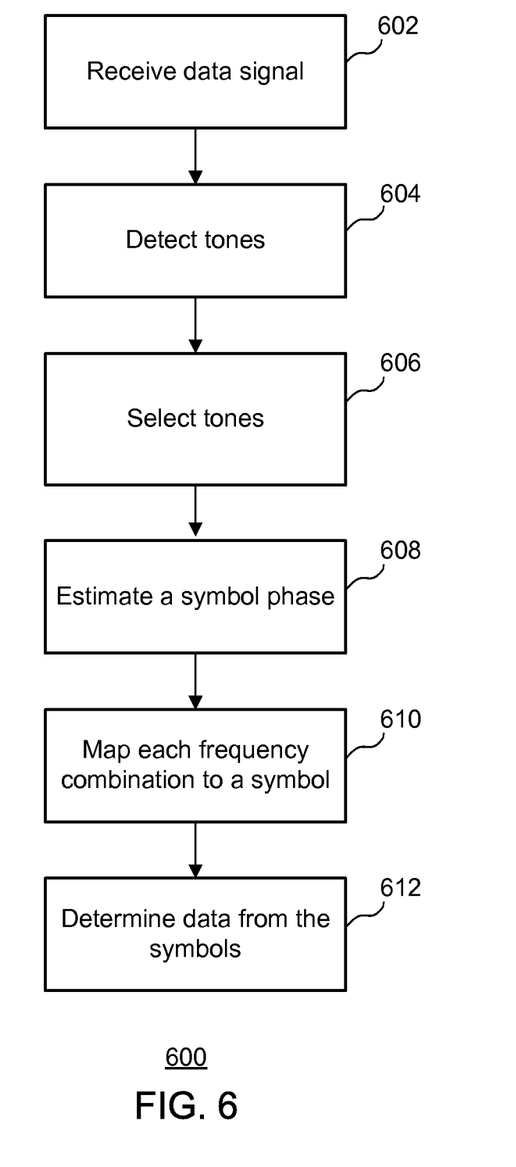
FIG. 6 illustrates an example simplified flow diagram for decoding data, according to some implementations.

FIG. 6 illustrates an example simplified flow diagram for decoding data, according to some implementations. Referring to both FIGS. 4 and 6, a method is initiated in block 602, where decoder 400 receives a data signal. Decoder 400 receives the data signal through tone detector 402.

In block 604, decoder 400 detects tones in the data signal.

As indicated above, each tone detector 502, 504, 506, and 508 is tuned to one of the N frequencies and outputs a signal indicating the power of that frequency. For each fixed time, decoder 400 determines the maximum tone power to construct a maximum tone signal.

Figure 7A:
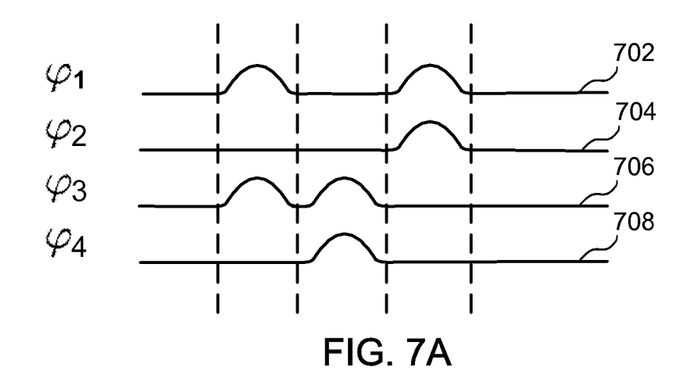
FIG. 7A illustrates an example tones, according to some implementations.

FIG. 7A illustrates example tones 702, 704, 706, and 708, according to some implementations.

In block 606, decoder 400 selects tones to determine frequencies of those tones. In some implementations, decoder 400 selects the largest tones to determine frequencies. For example, decoder 400 may select the two tones having the largest power. As described in more detail below, decoder 400 may then use the largest tones to determine frequency combinations.

In block 608, decoder 400 estimates a symbol phase.

Figure 7B:
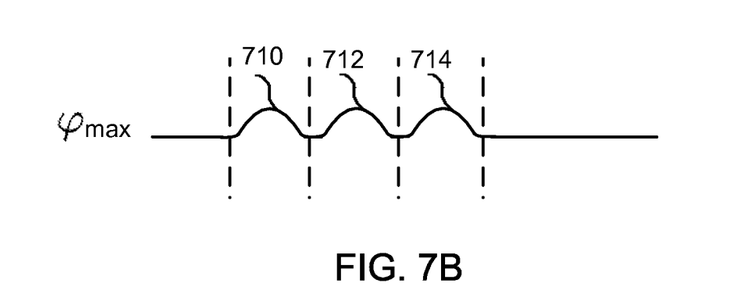
FIG. 7B illustrates an example peaks, according to some implementations.

FIG. 7B illustrates example peaks 710, 712, and 714, according to some implementations. Decoder 400 identifies the peaks of the data signal (e.g., peaks 710, 712, and 714) to synchronize the symbol phase of the DTMF symbols within the data signal.

In various implementations, to synchronize the symbol frames, decoder 400 partitions the signal into length-T frames, each frame encoding one symbol. Decoder 400 synchronizes the phase of the frames to determine what intervals of time correspond to the frames.

To estimate the frame phase, decoder 400 computes $$a_{max}(\tau) = \max_{\varphi} a_\varphi(\tau).$$

The frame phase is then estimated as $\tau^* = \arg\max_{96} a_{max}(\tau)$ modulo T. This allows to refer to the correlations in the nth frame at time offset $\tau_{n=\tau^*+T\ n}$.

In block 610, decoder 400 then maps each frequency combination to a symbol in order to determine symbols from the frequency combinations. As indicated above, each frequency combination includes one or more of the frequencies.

In block 612, decoder 400 then determines data from the symbols. A cleanly-received broadcast then appears at a fixed time as large outputs from K of the tone detectors and small outputs from the others. In some implementations, decoder 400 uses inverse mapping $S^{-1}$ to then determine the symbol represented by that combination of K large tone frequencies.

There are several ways that the tone detectors may be implemented, depending on the importance of objectives such as computational efficiency, noise robustness, and robustness to motion (Doppler shift). Example implementations of such detectors are described in more detail below.

In some implementations, decoder 400 may use a simple tone detector. For example, tone detector 402 may be a simple tone detector. In various implementations, a simple tone detector that is not coherent in phase. For a simple tone detector for detecting a tone of frequency φ, detector 400 may compute:

$$b(t) = x(t)e^{-i2\pi\varphi t}, \quad (6)$$

$$s(t) = |(b*h)(t)|^2. \quad (7)$$

The first line converts down to complex baseband, and the second estimates the local signal power, where h(t) is an order-2 Gamma smoothing filter of the form:

$$h(t) = \frac{1}{2\tau^2} t \exp(-t/\tau), \quad H(s) = \frac{1}{(1+\tau s)^2}, \quad (8)$$

where τ is the time constant controlling the bandwidth of the filter.

As described earlier, the energy of a tone is spread in the Fourier domain by the tone window. The bandwidth of the detector filter h(t) should be selected such that it captures most of the tone's energy. In various implementations, the bandwidth is wide enough to tolerate Doppler shift. If the maximum possible velocity is $\upsilon_{max}$, then the observed tone frequency satisfies:

$$\left(1 - \frac{v_{max}}{c}\right)\varphi \leq \varphi_{obs} \leq \left(1 + \frac{v_{max}}{c}\right)\varphi \quad (9)$$

where c is the speed of sound (340 m/s near sea level).

Correspondingly, the wider bandwidth in the Fourier domain implies that the impulse response h(t) should be more concentrated in the time domain than the window w(t). To achieve more noise reduction, decoder 400 may apply a second smoothing filter g(t) so that the overall effect of the detector aggregates over the full window length, $$\tilde{s}(t) = (s*g)(t), \quad (10)$$

While a simple tone detector is not coherent in the tone phase, this formulation is a practical and reliable tone detector. A simple tone detector might not take full advantage of the complex phase of b(t), since it has been removed by the square magnitude operation before aggregating the final score with g(t).

In some implementations, decoder 400 may use a coherent tone detector in order to take full advantage of the complex phase of b(t). For example, tone detector 402 may be a coherent tone detector. In various implementations, a coherent tone detector is a more sophisticated tone detector that is coherent in phase, which improves noise robustness over the simple detector.

The coherent tone detector begins in a similar way, first modulating to shift down to complex baseband b(t)=x(t)exp(−i2πφt) followed by decimation. There is a residual modulation of frequency $$\delta = \frac{\Delta v}{340 \text{ m/s}} \varphi$$

on the signal due to Doppler. The baseband signal occupies only a small bandwidth in the vicinity of 0 Hz, so the decimation can be quite aggressive. Decoder 400 performs the decimation by cell averaging. Decoder 400 then smoothes with a Gamma filter, and then down samples the result.

The following step is where the coherent tone detector differs from the simple tone detector. Given a time offset τ and Doppler shift frequency δ, the decimated baseband signal is correlated with the DTMF tone window, $$a_\varphi^{raw}(\tau,\delta) = |\int_0^T b(t+\tau)w(t)e^{-i2\pi\delta t} dt|^2. \quad (11)$$

Figure 8A:
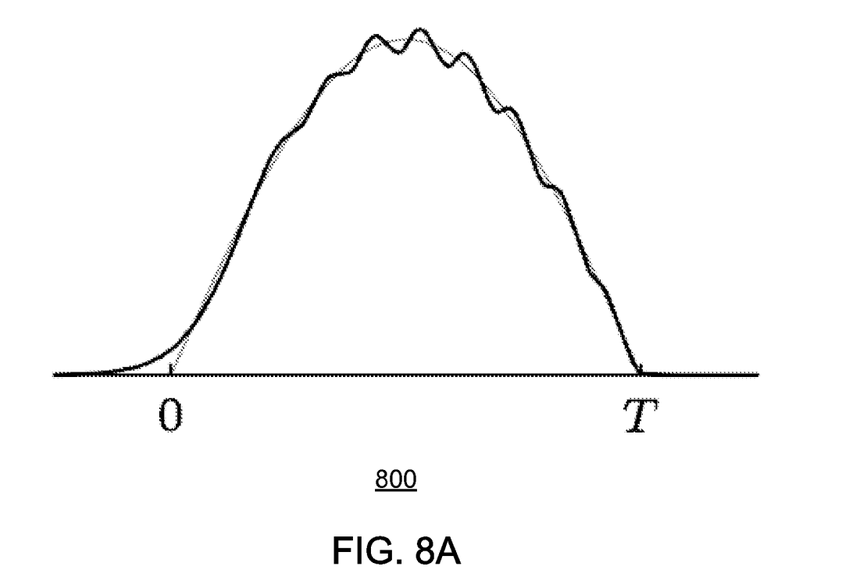
FIG. 8A illustrations an example tone window, according to some implementations.

FIG. 8A illustrations an example tone window 800, according to some implementations. As shown, decoder 400 performs a least-squares fit of the chunk contribution weights to the tone window w(t) using M=10 chunks.

Figure 8B:
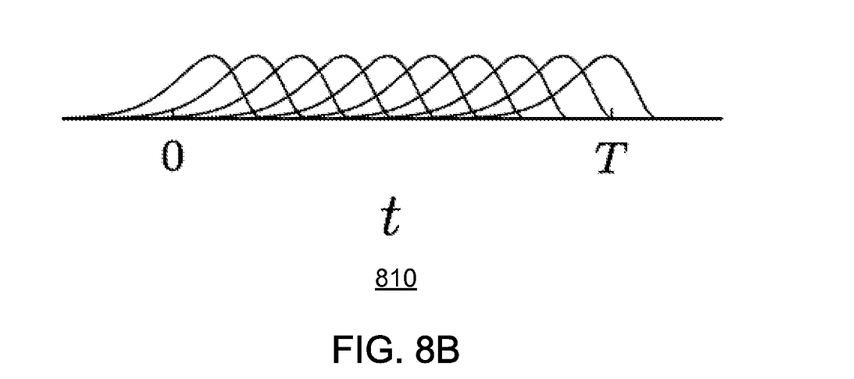
FIG. 8B illustrations an example illustration of contribution weights, according to some implementations.

FIG. 8B illustrations an example illustration of contribution weights 810, according to some implementations. Shown are individual contribution weights for each chunk.

In various implementations, the value is largest when (τ,δ) match the true time and frequency offset of the signal. In some implementations, decoder 400 samples (τ,δ) over a grid to perform a brute force search.

To compute the correlation efficiently, decoder 400 approximates the integral partitioning [0, T] into M panels and approximating the modulation as having constant phase over each panel, $$a_\varphi^{raw}(\tau, \delta) \approx \left| \sum_{m=0}^{M-1} \exp(i2\pi\delta(T/M)m) \int_{(T/M)m}^{(T/M)(m+1)} b(t+\tau)w(t) dt \right|^2, \quad (12)$$

where M is the number of chunks.

The following shows how decoder 400 gains further efficiency with another approximation. The chunk correlations $\int_{(T/M)m}^{(T/M)(m+1)} b(t+\tau)w(t)dt$ are against chunks of the window, which are smooth functions. Decoder 400 may consider an approximation of the form $$a_\varphi^{raw}(\tau, \delta) \approx \left| \sum_{m=0}^{M-1} \exp(i2\pi\delta(T/M)m)(w_m * b)(t+\tau) \right|^2, \quad (13)$$

where the $w_m$ are filters corresponding to chunks of w(t). These impulse responses of these filters are allowed to have some overlap, and least-squares fitting it are used so that their combination approximates w(t).

In some implementations, decoder 400 normalizes tone correlations such that the system is invariant to multiplying the input by a constant scale factor. In some implementations, decoder 400 also normalizes of tone correlations such that noise is normalized. The noise is normalized in a way that allows the resulting scores to be compared to a fixed constant threshold to decide signal quality.

The tone correlations are power signals since they are squared magnitudes. If the baseband signal is white Gaussian noise, then the tone correlations are distributed proportional to $x^2(2)$ with a mean proportional to the baseband noise variance. In some implementations, for an effective normalization, decoder 400 may divide the tone correlations by a local estimate of the noise mean.

For each time τ, decoder 400 may perform the following. In some implementations, decoder 400 makes a list of tone correlations for each tone frequency $\varphi_n$ maximized over δ:

$$\left\{\max_{\delta} a_{\varphi_1}^{raw}(\tau, \delta), \ldots, \max_{\delta} a_{\varphi_N}^{raw}(\tau, \delta)\right\}. \quad (14)$$

In some implementations, decoder 400 then sorts the list. Assuming the signal-to-noise ratio (SNR) is sufficiently large, the largest K correlations correspond to the DTMF tones, and the lower (N–K) values to noise. Let $\Phi^{noise}$ be the set of frequencies corresponding to the lower (N–K) values. (It is sufficient to find the Kth largest value, as the list does not need to be fully sorted.)

In some implementations, decoder 400 then sums the tone correlations over δ and frequencies in $\varphi^{noise}$:

$$s_\varphi(\tau) = \sum_{\varphi \in \Phi^{noise}} \sum_{\delta \in \Delta} a_\varphi^{raw}(\tau, \delta). \quad (15)$$

In some implementations, decoder 400 applies a smoothing filter g to temporally smooth the noise correlation averages $$\mu_\varphi^{noise} = \frac{1}{(N-K)|\Delta|} g * s_\varphi. \quad (16)$$

Then the quantity $\mu^{noise}(t)$ is approximately proportional to the baseband noise variance. The tone correlations are normalized by dividing pointwise by $\mu_\varphi^{noise}(t)$, $$a_\varphi(\tau, \delta) = a_\varphi^{raw}(\tau, \delta) \mu_\varphi^{noise}(t). \quad (17)$$

Subsequently only the correlation with the best matching Doppler shift frequency is used, so it can be maximized over δ, $$a_\varphi(\tau) = \max_{\delta \in \Delta} a_\varphi(\tau, \delta).$$

In various implementations, when decoder 400 decodes symbols, a cleanly-received DTMF symbol should produce K large tone correlations and (N–K) small ones. In various implementations, decoder 400 may apply one or more of the follow predetermined rules for broadcast detection and avoiding of errors due to interference. Such predetermined rules are described in more detail below.

In some implementations, fewer than K large correlations may suggest that no DTMF broadcast is active, and any tones heard are background noise. In some implementations, more than K large tone suggests there is strong interference with the DTMF broadcast, and an unambiguous decoding cannot be made if the Kth largest correlation is not well separated from the (K+1)th largest. Following these rules, the decoder may identify frames where there appear to be valid DTMF symbols, and include only these frames in decoding.

Implementations described herein provide various benefits. For example, implementations address challenges associated with data transmission of sound. Such challenges may involve the sound signal being degraded by multiple propagation paths (with echoes), background noise, and Doppler effect. Implementations limit computation and battery consumption. Implementations transmit data over sound such that the data survives audio compression, e.g., to transmit using sound over teleconferences, which necessitates using audio in the audible range. Implementations also provide data transmission over sound in such a way that the sound of the transmission is not unpleasant or painful for people to hear.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 9:
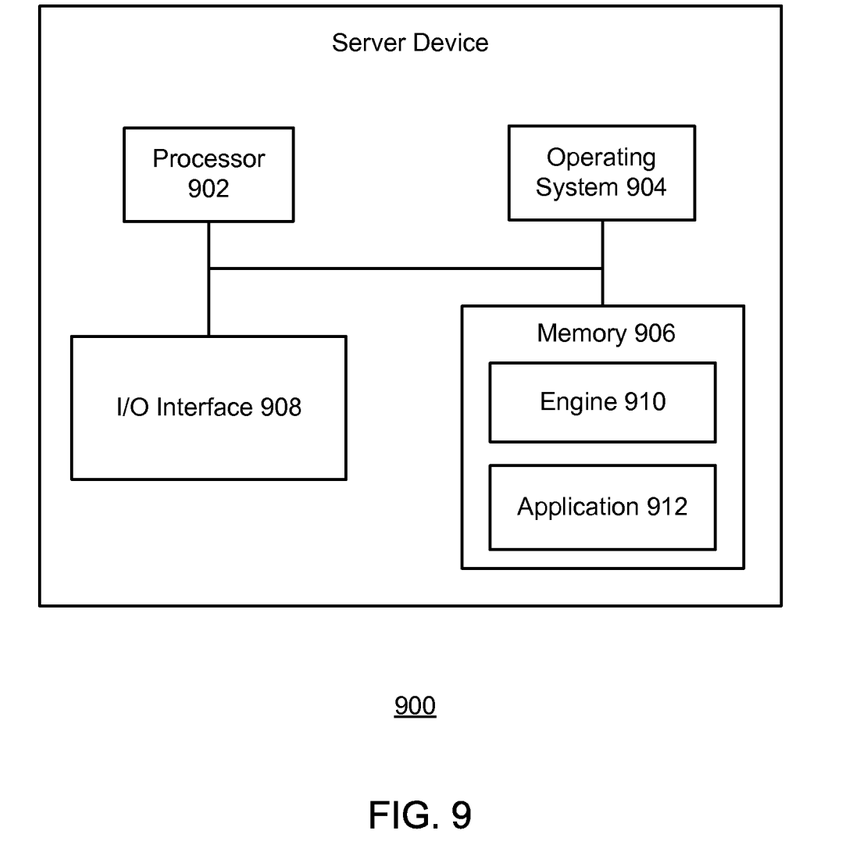
FIG. 9 illustrates a block diagram of an example server device, which may be used to implement the implementations described herein.

FIG. 9 illustrates a block diagram of an example server device 900, which may be used to implement the implementations described herein. In some implementations, server device 900 includes a processor 902, an operating system 904, a memory 906, and an input/output (I/O) interface 908. Server device 900 also includes a social network engine 910 and a media application 912, which may be stored in memory 906 or on any other suitable storage location or computer-readable medium. Media application 912 provides instructions that enable processor 902 to perform the functions described herein and other functions.

For ease of illustration, FIG. 9 shows one block for each of processor 902, operating system 904, memory 906, I/O interface 908, social network engine 910, and media application 912. These blocks 902, 904, 906, 908, 910, and 912 may represent multiple processors, operating systems, memories, I/O interfaces, network engines, and applications. In other implementations, server device 900 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

What is claimed is:

1. A computer-implemented method comprising:
   mapping, by one or more processors, each symbol of data to a frequency combination, wherein each frequency combination includes one or more frequencies and one or more overtones;
   generating, by the one or more processors, a sine wave for each frequency;
   adding, by the one or more processors, sine waves for a given symbol to obtain a resulting sine wave;
   multiplying, by the one or more processors, the resulting sine wave by a window function to obtain a data signal;
   concatenating symbol waveforms in the data signal without gaps; and
   transmitting, by a speaker, the data signal as audio, wherein the audio resembles sound produced by a particular instrument based on the one or more overtones.

2. The method of claim 1, wherein the audio is detectable after audio compression is performed on the data signal.

3. The method of claim 1, wherein each symbol is associated with a unique combination of frequencies.

4. The method of claim 1, wherein mapping each symbol of data to the frequency combination is based on predetermined selection constraints, wherein the predetermined selection constraints include a selection of frequencies that are at least two indices apart from one another.

5. The method of claim 1, wherein mapping each symbol of data to the frequency combination is based on predetermined selection constraints, wherein one or more predetermined selection constraints include a selection of frequencies that correspond to musical tones of a predetermined musical scale.

6. The method of claim 1, wherein mapping each symbol of data to the frequency combination is based on predetermined selection constraints, wherein one or more predetermined selection constraints include selecting frequencies that provide a musical sound to data transmission as audio.

7. The method of claim 1, wherein the window function is a sine window.

8. The method of claim 1, wherein the window function is a Fourier transform of a sine window that includes a removable singularity.

9. A system comprising:
   one or more processors;
   logic encoded in one or more tangible media for execution by the one or more processors and when executed operable to perform operations comprising:
      mapping each symbol of data to a frequency combination, wherein each frequency combination includes one or more frequencies and one or more overtones;
      generating a sine wave for each frequency;
      adding sine waves for a given symbol to obtain a resulting sine wave;
      multiplying the resulting sine wave by a window function to obtain a data signal; and
      inserting one or more spacer values in the data signal to mark a beginning of a token in the data signal; and
   a speaker that transmits the data signal as audio, wherein the audio resembles sound produced by a particular instrument based on the one or more overtones.

10. The system of claim 9, wherein the audio is detected by a microphone that is part of a user device.

11. The system of claim 9, wherein each symbol is associated with a unique combination of frequencies.

12. The system of claim 9, wherein mapping each symbol of data to the frequency combination is based on predetermined selection constraints.

13. The system of claim 9, wherein mapping each symbol of data to the frequency combination is based on predetermined selection constraints, wherein one or more predetermined selection constraints include a selection of frequencies that correspond to musical tones of a predetermined musical scale.

14. The system of claim 9, wherein mapping each symbol of data to the frequency combination is based on predetermined selection constraints, wherein one or more predetermined selection constraints include selecting frequencies that provide a musical sound to data transmission.

15. The system of claim 9, wherein the logic when executed is further operable to perform operations comprising concatenating symbol waveforms in the data signal without gaps.

16. The system of claim 9, wherein the logic when executed is further operable to perform operations comprising concatenating symbol waveforms in the data signal with one or more gaps.

17. A computer-implemented method comprising:
   receiving, by a microphone, audio that includes a data signal that includes concatenated symbol waveforms without gaps, wherein the audio resembles sound produced by a particular instrument;
   detecting, by one or more processors, tones in the data signal;
   determining, by the one or more processors, frequencies from the tones; and
   mapping each frequency combination to a symbol of data, wherein each frequency combination includes one or more of the frequencies and one or more overtones.

18. The method of claim 17, wherein detecting tones in the data signal includes converting the audio down to a complex baseband and estimating a local signal power.

19. The method of claim 17, further comprising estimating a symbol phase.

20. The method of claim 17, wherein a coherent tone detector detects the tones in the data signal and further comprising normalizing tone correlations in the tones such that a system is invariant to multiplying an input by a constant scale factor.

* * * * *